July 6, 1926.

W. H. CHURCH

OILING DEVICE FOR BEARINGS

Filed Oct. 10, 1925

1,591,361

INVENTOR
William H. Church
BY
Herbert G. Ogden
HIS ATTORNEY

Patented July 6, 1926.

1,591,361

UNITED STATES PATENT OFFICE.

WILLIAM H. CHURCH, OF NORWALK, CONNECTICUT, ASSIGNOR TO INGERSOLL-RAND COMPANY, OF JERSEY CITY, NEW JERSEY, A CORPORATION OF NEW JERSEY.

OILING DEVICE FOR BEARINGS.

Application filed October 10, 1925. Serial No. 61,639.

This invention relates to bearings, but more particularly to an oiling device for thrust bearings.

One object of the invention is to insure a positive supply of lubricant to the cooperative surfaces of a thrust bearing and a rotatable shaft irrespective of the rotative speed of the shaft.

Other objects will be in part obvious and in part pointed out hereinafter.

The invention consists of the combinations of elements, features of construction and arrangement of parts having the general mode of operation substantially as hereinafter described and more particularly pointed out in the appended claims and illustrated in the accompanying drawings, in which—

Figure 1:
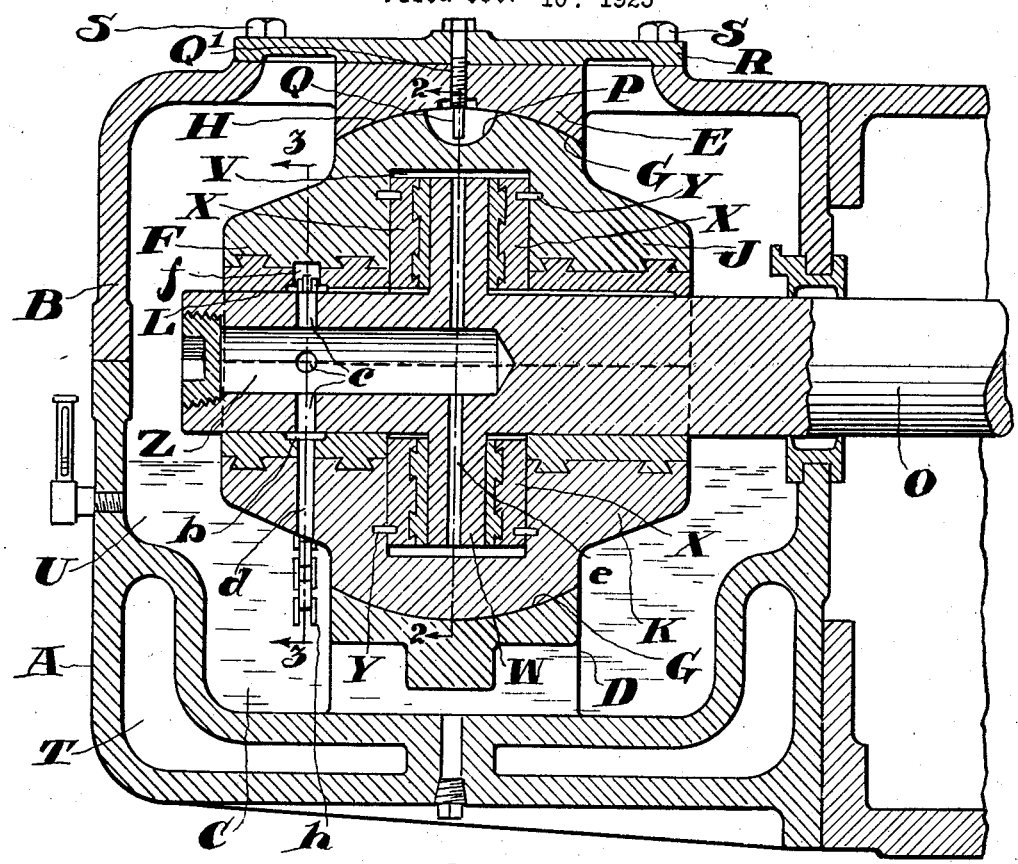
Figure 2:
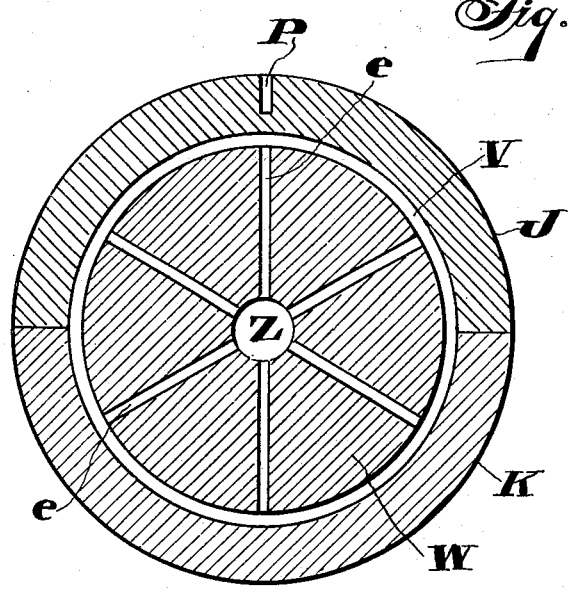
Figure 3:
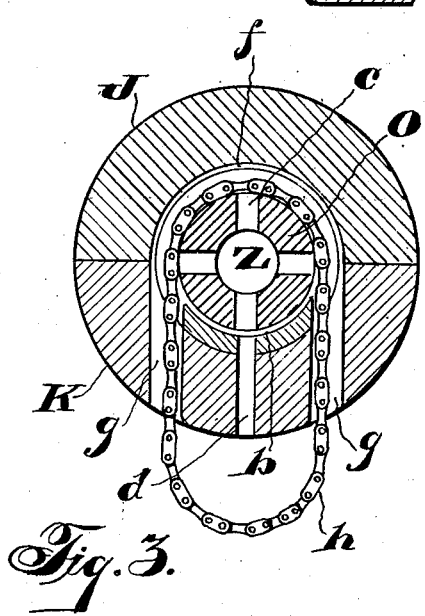

Figure 1 is an elevation in section of a thrust bearing and a shaft equipped with an oiling device constructed in accordance with the present invention, Figure 2 is a transverse sectional view taken through Figure 1 on the line 2—2 looking in the direction of the arrows, and Figure 3 is a transverse sectional view through Figure 1 taken on the line 3—3 looking in the direction of the arrows.

Referring to the drawings, and more particularly to Figure 1 in which one modification of the invention is shown embodied in a thrust bearing having a bearing housing A to which may be secured in any suitable manner a cap B. The bearing housing A may be of any convenient form or shape but is preferably rectangular to form an oil reservoir C. Within the bearing housing A and preferably formed integrally therewith is a support D and a similar support E is formed integrally with the cap B. The supports D and E are so formed that when the cap B is secured to the bearing housing A, said supports will form a continuous support for a bearing F.

In the present instance the supports D and E are provided with a spherical bore G to cooperate with a spherically formed bearing portion H on the bearing F. The bearing F in this instance comprises a top section J and a bottom section K and has a longitudinal bore L to receive a shaft O. In order to prevent rotation of the bearing F within the supports D and E a slot P is formed on the top of the top section J to receive a tip Q of a screw Q' screwed into the support E. The slot P is preferably of semi-circular shape so that the bearing F may tilt through a vertical plane and is only of sufficient width to receive the tip of the screw Q'. A removable cover R forms a closure for the reservoir C and is held in position by means of bolts S. In this instance a cooling jacket T is formed in the bearing housing A to receive any suitable cooling liquid, such as water, for the purpose of maintaining an even temperature of the oil U in the reservoir C.

In accordance with the practice of the invention, an annular chamber V is formed within the bearing F preferably intermediate its ends to receive a flange W which may be formed integrally with the shaft O, or if desired, may be formed separately and secured to said shaft. The chamber V is preferably of somewhat larger diameter than the flange W so that a slight space exists between the annular wall of the chamber and the periphery of the flange and is of suitable width to receive thrust shoes X on each side of the flange W against which the longitudinal thrust of the shaft may be transmitted. The thrust shoes X like the bearing sections J and K are also formed in half sections and in this instance are secured against rotation by dowel pins Y. Formed in one end of the shaft O is a chamber Z which communicates with an annular groove $b$ formed in the bore L through radial ports $c$. A passage $d$ formed through the bottom section K provides communication for the groove $b$ with the reservoir C.

Leading from the chamber Z through the flange W to its periphery are a plurality of radial passages $e$ through which oil may pass to the chamber V. The walls of the passages $e$ in this instance serve as impellers for drawing the oil from the reservoir C through the passage $d$ into the annular groove $b$, thence through the ports $c$ into the chamber Z. The passages $e$ are of sufficiently greater length than the ports $c$ to create a preponderance of pressure at their outer ends over the pressure created by the ports $c$. In this way the oil is drawn through the channels described into the chamber Z from whence it is forced radially outwardly under pressure into the chamber V.

Additional means are provided for insuring an immediate supply of oil to the chamber Z at the time the shaft O begins to rotate and before it has attained its normal speed. To this end an annular groove $f$ is formed in the top bearing section J to register at its ends with vertical guideways $g$ formed in the bottom bearing section K for the purpose of receiving an endless chain $h$ which is supported by the shaft O and adapted to be actuated thereby whenever the shaft is rotating at slow speed. The chain $h$ is of sufficient length to exend well downwardly into the reservoir C and preferably hangs directly over the ports $c$ so that when the shaft O starts to rotate the chain will be actuated and the oil adhering thereto will be carried to the ports $c$ and pass therethrough into the chamber Z. If desired sprockets may be secured to the shaft O to engage the chain $h$ to insure continuous rotation of said chain at all speeds of the shaft. It has, however, been found that the impeller devices described will provide an adequate supply of oil to the bearing after the shaft O attains a certain speed. For this reason it is preferred that the chain $h$ be mounted loosely on the shaft O to enable the chain to slip with respect to the shaft after said shaft attains sufficient speed to set the pumping apparatus in operation.

The above described device has been found to function in an unusually efficient manner. Owing to the manner in which the chain $h$ lifts or conveys the lubricant from the reservoir C to the chamber Z a positive supply of oil is insured at the time the shaft starts to rotate. In addition to conveying oil to the bearing, the chain $h$ also serves to agitate the oil in the reservoir, thus insuring a substantially uniform temperature throughout the oil supply. Another desirable feature is that after the shaft O attains its full speed a continuous and uniform supply of oil under pressure will be supplied to all the cooperating surfaces of the bearing F and the shaft O.

Although the invention is herein shown embodied in a thrust bearing, it is to be understood that I do not intend to limit its application to the type of bearing illustrated, but that it may also be applied to other types of bearings without departing from the spirit of the invention or the scope of the claims.

I claim:

1. An oiling device for a thrust bearing having a passage, an oil reservoir, means for conveying oil from the reservoir to the said passage, a shaft rotatable in the bearing having a chamber and radial ports constantly in communication with said passage, and a flange on the shaft for transmitting the thrust of the shaft to the bearing, said flange having passages leading from the chamber to the periphery of the flange to act as impellers for drawing oil into the chamber and for centrifugally forcing such oil from the chamber to the bearing for lubricating said bearing.

2. An oiling device for a thrust bearing having a passage, an oil reservoir in constant communication with the passage, a shaft rotatable in the bearing having a chamber and radial ports constantly in communication with said passage, a flange on the shaft for transmitting the thrust of the shaft to the bearing, said flange having passages leading from the chamber to the periphery of the flange to act as impellers for drawing oil into the chamber and for centrifugally forcing such oil from the chamber to the bearing for lubricating said bearing, and means supported loosely by the shaft and actuated by said shaft for conveying oil from the reservoir to the passage.

In testimony whereof I have signed this specification.

WILLIAM H. CHURCH.